Sept. 22, 1953  R. NEBOLSINE  2,653,129
INSTALLATION FOR THE COLLECTION, TREATMENT, AND
DISTRIBUTION OF WATER
Filed Oct. 2, 1950  2 Sheets-Sheet 1
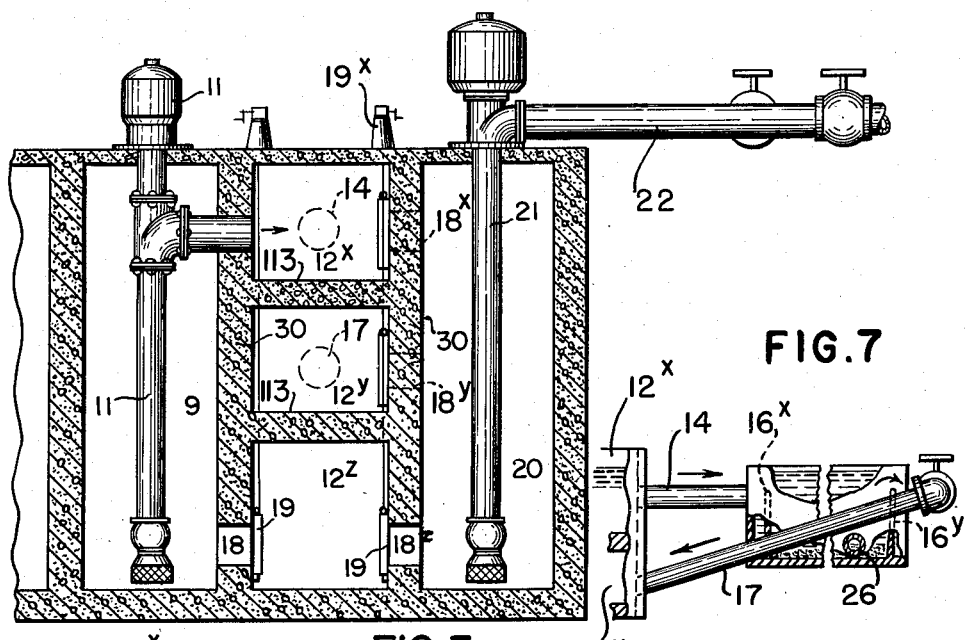
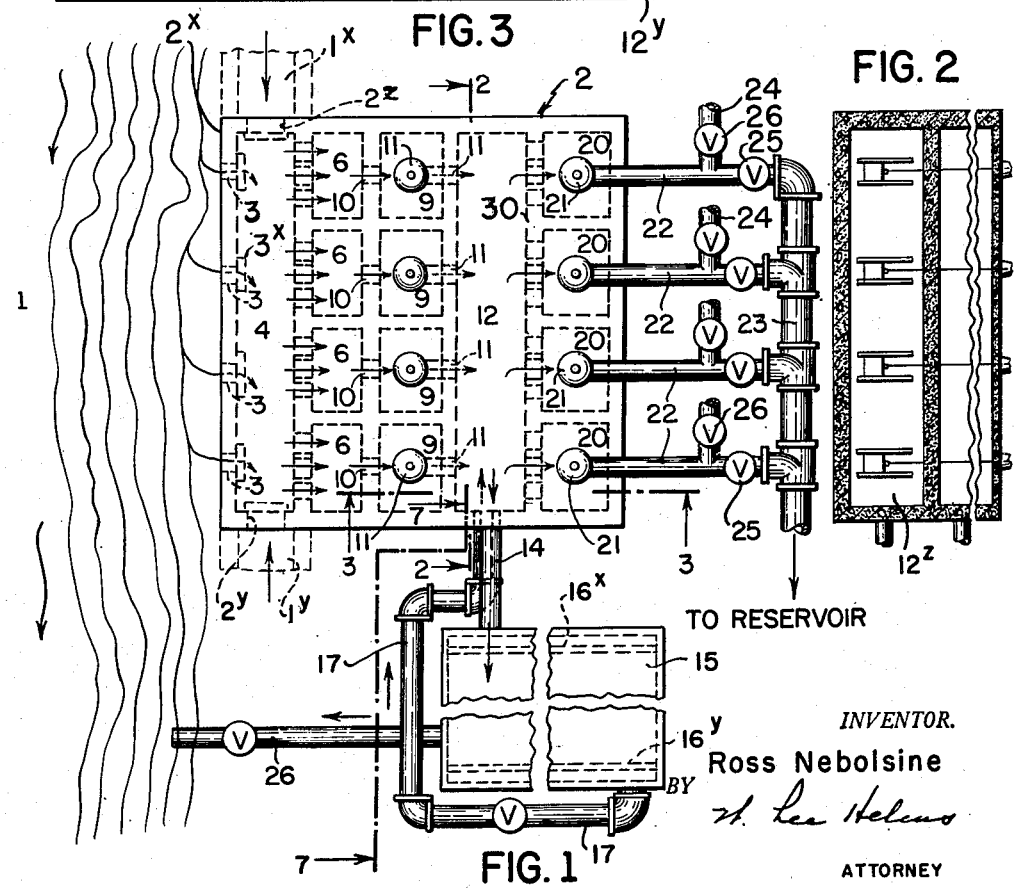
INVENTOR.
Ross Nebolsine
ATTORNEY

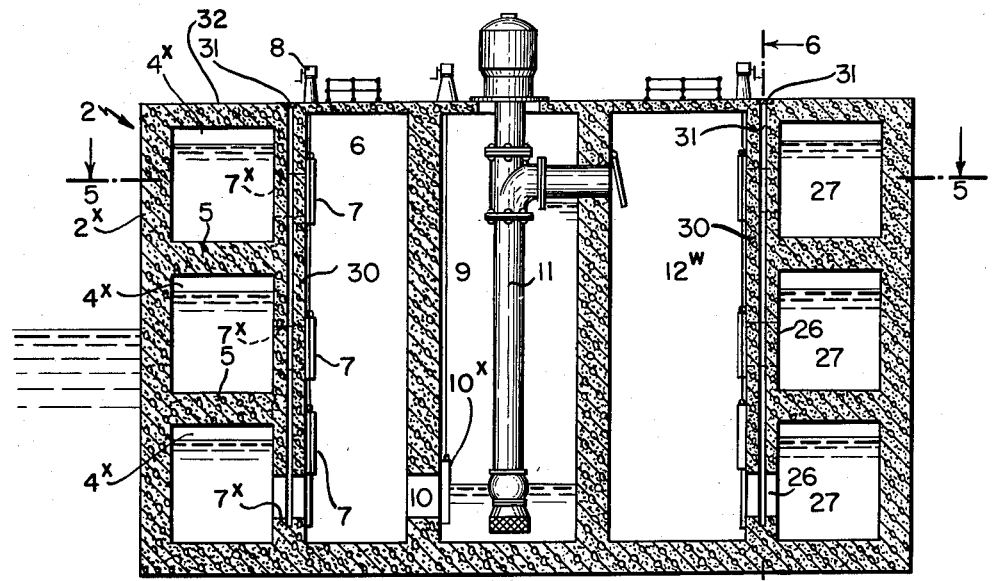
FIG. 4
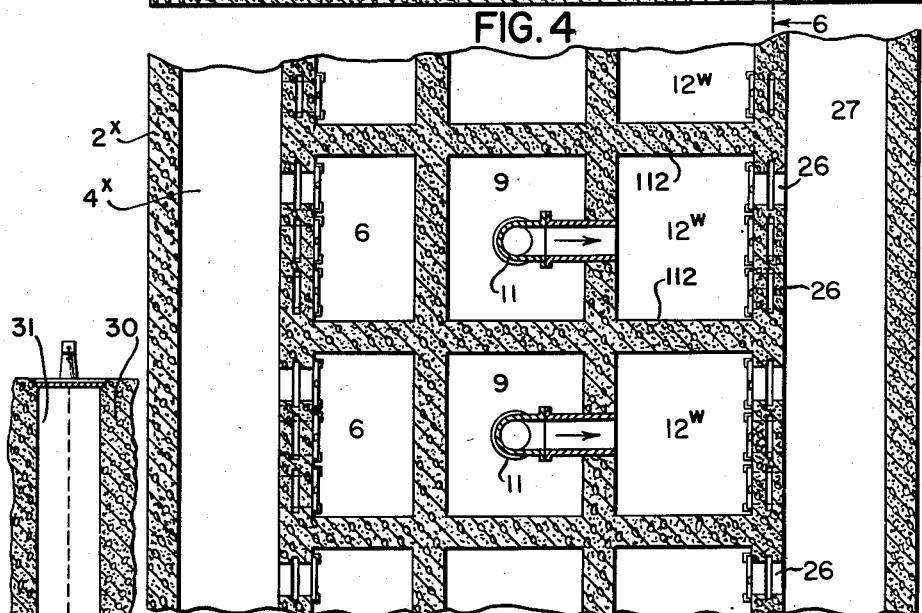
FIG. 5
FIG. 6

Patented Sept. 22, 1953

2,653,129

UNITED STATES PATENT OFFICE 2,653,129

INSTALLATION FOR THE COLLECTION, TREATMENT, AND DISTRIBUTION OF WATER

Ross Nebolsine, New York, N. Y.

Application October 2, 1950, Serial No. 188,022

7 Claims. (Cl. 210—13)

This invention relates to an installation for collecting, treating and distributing water taken from a river, lake, estuary or other natural body and distributed for domestic and industrial purposes.

Water collection and delivery installations such as in-takes and pumping stations, as heretofore constructed, involve several disadvantages. In practice, it has been found that these prior art constructions do not have adequate provisions for abstracting the supply from the water body being exploited at various points or depths in order to obtain a more suitable supply of raw water taken into the installation. Furthermore, the present installations lack flexibility in handling the water in various ways such as circulating the water through basins or tanks for settling or other water treatment purposes, or utilizing the same pumps for any one of several different sources of supply, or discharging one or several varieties of water through separate pumps and through different conduits to various points of use, or providing separate safeguards for continual and dependable operation of the installation as a whole by eliminating any interruptions that may be caused by breakdown of any part of the installation, including the water abstraction and screening facilities, pumps, valves, gates or discharge conduits.

The primary object of the present invention is to provide an installation wherein the above defects are obviated.

A further object of the invention is to provide in a single installation an arrangement for selectively abstracting raw water from any one or more of several different sources, points or levels of a natural water body and for distributing the water thus collected to a selected one or more of a plurality of service pipe lines leading to the points of consumption.

Another object of the invention is to provide a novel arrangement for controlling the flow of water through the installation whereby individual parts of the latter may be shut off without interruption of the other parts.

A further object is to provide means for diverting or by-passing part or all of the collected water through settling basins or other treatment tanks and then returning the treated water to the installation for distribution.

Still another object of the invention is to provide an arrangement wherein any control valve or gate of the installation may be inspected, removed, repaired or replaced without interrupting the operation of the remaining parts of the installation which continue to function unaffected by the maintenance operations.

It is to be understood that the particular embodiments of the invention shown in the drawings and described in the specification are intended to be merely illustrative of several of the many forms which the invention may take in practice and are not to limit the scope of the invention; the latter being delineated in the appended claims.

Other objects and advantages of the present invention are inherent in the structure as claimed and as disclosed in the specification and in the drawings wherein:

Fig. 1 is a plan view of an installation embodying a preferred form of the invention;

Fig. 2 is a vertical sectional view taken on the line 2—2 of Fig. 1;

Fig. 3 is a vertical sectional view taken on the line 3—3 of Fig. 1;

Fig. 4 is a vertical sectional view similar to Fig. 3 but showing a modified form of the invention;

Fig. 5 is a horizontal sectional view taken on the line 5—5 of Fig. 4;

Fig. 6 is a vertical sectional view taken on the line 6—6 of Fig. 4, and

Fig. 7 is a detail view of the settling tank and piping therefor, the tank being partially broken away to show the inner construction.

Referring first to Fig. 1, the reference numeral 1 indicates a water stream or body of water on the shore of which is a preferred form of the installation 2 embodying the present invention. The installation 2 is preferably formed of concrete and is provided with an end wall $2^x$ having a plurality of inlet ports 3 in communication with the body of water 1. The inlet ports 3 may be controlled by valves (not shown) and are equipped with suitable screens $3^x$. The ports 3 also communicate with a transversely extending chamber 4. The latter may extend vertically throughout the effective height of the structure 2, as in the embodiment shown in Fig. 1, or it may be divided by horizontal partitions 5 into a plurality of superimposed horizontally extending chambers $4^x$, as in the embodiment shown in Fig. 4.

The reference numerals $1^x$ and $1^y$ indicate conduits leading from two other supply sources of water and communicating with the interior of the chamber 4 or series of chambers $4^x$ by means of inlet ports $2^z$ and $2^y$, respectively. It will thus be seen that water from several different points, sources or levels may be collected within the chamber 4 or 4$^x$.

The chamber or chambers 4, 4$^x$ are equipped with controls to selectively collect water from the water body 1, and discharge it to any one or more of a plurality of vertical cells or chambers 6. As shown in Fig. 4, each of the chambers 4$^x$ is provided with a plurality of openings 7$^x$ communicating with each of the chambers 6. The selective control of water flowing from the chambers 4, 4$^x$ to the chambers 6 is provided by a plurality of gates 7 independently slidably mounted on the partition wall 30 for vertical movement so as to close or open any one or more of the openings 7$^x$ as may be desired. A plurality of suitable hoist devices shown schematically at 8 may be provided for the independent raising and lowering of the gates 7.

Each of the vertical cells or chambers 6 is placed to the rear or suction side of one of a transverse series of pump wells 9. The cells 6 are connected to the respective pump wells 9 by means of apertures indicated at 10 in Figs. 1 and 4. The flow through the apertures 10 may be controlled by gates 10$^x$, if desired, although this expedient is not necessary. Within each of the pump wells 9 is a pump 11.

A distributing bay or chamber 12 is located adjacent to the discharge sides of the series of pump wells 9. The chamber 12 may be in the form of a single cell extending vertically and horizontally throughout the height and width of the structure, or may be compartmentalized by vertical partition walls 112 into a series of vertically extending chambers 12$^w$ as shown in Fig. 5, or as shown in Figs. 1 to 3 may be divided by horizontal partition walls 113 so as to form a plurality of horizontally extending super-imposed chambers 12$^x$, 12$^y$, 12$^z$, the latter form being preferred. In the first modification, all of the pumps 11 discharge into the single chamber 12 whereas in the modifications shown in Figs. 1 to 3 the pumps 11 discharge into the uppermost compartment or chamber 12$^x$. In the modification shown in Figs. 4 and 5, each of the pumps 11 discharges into a respective one of the vertically extending chambers 12$^w$.

The settling arrangement will now be described with reference only to the modification shown in Figs. 1 to 3; its application to the other modification of Figs. 4 and 5 will then have become obvious. As shown in Figs. 3 and 7, a pipe or conduit 14 communicates at one end with the interior of the uppermost chamber 12$^x$ and at the other end to a settling basin or tank 15. The latter is placed above the level of the main water body, this being possible because of the lifting action of the pumps 11. A vertical baffle 16$^x$ is provided within the basin 15 adjacent the discharge end of the pipe 14 and a second baffle 16$^y$ is provided at the opposite end of the basin 15. As the water passes over the baffles 16$^x$, 16$^y$ settling occurs so as to deposit sedimentation and other impurities at the bottom of the basin 15. This deposited sedimentation may be discharged back to the water body 1 or to a sewer (not shown) by means of conduit 26, and suitable pumping means may be employed to facilitate this discharge. After having been subjected to this settling treatment, the water leaves the basin 15 by means of the pipe or conduit 17 which discharges the water into the intermediate chamber 12$^y$.

A second transversely extending series of vertical pump wells 20 is provided adjacent the chambers 12 and is separated therefrom by a vertical partition wall 30. A series of openings 18$^x$ are formed in the wall 30 and communicate between chamber 12$^x$ and the pump wells 20. Similarly, the pump wells 20 are also connected to the chambers 12$^y$ and 12$^z$ by means of openings 18$^y$ and 18$^z$, respectively, formed in the wall 30. The openings 18$^z$, 18$^x$ and 18$^y$, may be individually controlled by suitable gates 19 actuated by hoist devices indicated schematically at 19$^x$. It will be noted that by controlling the position of gates 19, any one or more of several different paths of water flow from the pump wells 9 to the pump wells 20 may be selected. For instance, if the openings 18, 18$^z$ are allowed to remain open while the openings 18$^x$, 18$^y$ are closed, the water will flow directly from the pump wells 9 through the openings 18 to the lower-most chamber 12$^z$ and then through the openings 18$^z$ to the pump wells 20. An alternative path of flow will be obtained if the openings 18, 18$^z$, 18$^x$ are closed and the opening 18$^y$ is allowed to remain open. In this case the water in the pump wells 9 will be discharged by the pumps 11 into the uppermost chamber 12$^x$ from which they will be carried by the pipe 14 through the settling basin 15 and then through the pipe 17 into the intermediate chamber 12$^y$ from which they will discharge into the pump wells 20 by means of the openings 18$^y$. It will also be seen that if the openings 18$^x$, 18$^y$ are allowed to remain open while the openings 18, 18$^z$ are closed, water will flow from the pumps 11 into the uppermost chamber 12$^x$ and from there to both the settling basin 15 and also directly through the opening 18$^x$ to the pump wells 20. It will thus be seen that by a suitable selection of openings to be closed by the gates 19, either all, part or none of the water flowing through the installation may be passed through the settling basin 15.

As shown in Fig. 1, a pump 21 is located within each of the pump wells 20 and is connected to a respective one of a plurality of valve controlled conduits 22 which lead to a common discharge header or manifold 23. Each of the conduits 22 is provided with a branch conduit 24 leading to various other points which are to be supplied with water. By suitably adjusting valves 26 and 25 the discharge from any or all the conduits 22 may be led through the branch conduits 24 to said other points to be supplied, or may be cut off completely so as to allow the entire water supply to go through the main discharge header or manifold 23.

It will be noted that the pumps 11 are preferably provided with a higher pumping head and capacity than the pumps 20 since the amount of water flowing through the latter is less than that flowing through the former by the amount which is discharged from the settling basin 15 through the pipe 26. The greater the increase in capacity of the pumps 11 over the pumps 21, the greater will be the amount of water which may be returned to the water body 1 through the pipe 26.

The arrangement shown in Figs. 4 and 5 is a modification of that shown in Figs. 1 and 3 in that the superimposed cells or chambers 12$^x$, 12$^y$, 12$^z$ are replaced by a plurality of separate vertical distributing cells 12$^w$ each of which is adapted to discharge through gate controlled apertures 26 to a plurality of separate chambers or channels 27. These conduits may be in the form of metallic pipes, if pressure resistance so requires.

The arrangement for enabling the gates such as at 7, 19 and 19$^x$ to be inspected, repaired, removed or replaced without interrupting the operation of the remaining portions of the installation will now be described. As best seen in Figs. 4 and 5, each of the vertical partition walls 30 separating the various cells, chambers and wells is provided with a plurality of vertically extending slots or shafts 31 communicating at their upper ends with the upper or roof surface 32 of the installation. Each of the vertical slots 31 communicates at its lower end with one of the openings, such as 7ˣ and 26 in Fig. 4. It is therefore possible to drop an auxiliary emergency gate or stoplogs down into the slots 31 so as to block off any one or more of the openings in the walls 30, thereby closing off one or more of the individual cells or chambers so as to enable maintenance work to be performed on the respective gate or gates associated with the particular blocked-off openings without interruption of the operation of the other cells or chambers of the installation.

It will thus be seen that by providing individual vertical separate cells 6 between the chambers 4 and the first series of pumps 11, water may be selectively abstracted from different sources or under different conditions. Furthermore, by providing the slots or shafts 31 in the partition walls 30 any breakdown of the individual pump bay assemblies need not interrupt or effect functioning of the other pump bay assemblies and their connecting chambers and discharge lines.

By means of the superimposed transverse chambers 12ˣ, 12ʸ, 12ᶻ, it is possible either to convey the supply through settling or other water treatment installations or to convey the supply directly to the distributing conduits 22, 23, 24 without the water treatment step, as may be desired. This provides the advantage of performing several operations commonly requiring distinct and separate installations in the one assembly of the present invention, thus reducing not only the first cost of the plant required, but also reducing maintenance and supervision that would otherwise be necessary.

By means of the separate individual vertical distributing cells 12ʷ it is possible to utilize any one of the pump bay assemblies for various purposes. Thus, if raw water is required at one point to be supplied, and settled water is required at another point, the arrangement shown in Figs. 4 and 5 may be employed so as to utilize one or more of the pump bay assemblies for raw water and the other pump bay assemblies for settled water, as will be understood by those skilled in the art.

Having described my invention, what I claim and desire to secure by Letters Patent is as follows:

1. A central water collecting and transmission installation comprising a substantially enclosed concrete structure having an interior partitioned by a series of parallel vertical walls so as to form a plurality of longitudinally extending bays between said walls, the first of said plurality of longitudinal bays having controlled means leading to a plurality of water channels, the second and third of said longitudinal bays having continuous transverse walls forming a plurality of cells in the second bay and a plurality of pump wells in the third bay, means for controlling the flow of water from said first bay to the cells of said second bay, means for controlling the flow of water from the cells to the base of the pump wells, said pump wells being provided with pumps having outlet orifices adjacent the top of the said wells, and a distributing bay communicating with said orifices and adapted to receive pumped water and distribute same.

2. A central water collecting and transmission installation comprising a concrete structure having an interior partitioned by a series of parallel vertical walls so as to form a plurality of parallel longitudinally extending bays between said walls, the first of said plurality of longitudinal bays being divided by a plurality of horizontal walls into a plurality of horizontal chambers having controlled means leading to a plurality of water channels, the second and third of said longitudinal bays having continuous transverse walls forming a plurality of cells in the second bay and a plurality of pump wells in the third bay, means for controlling the flow of water from said first bay to the cells of said second bay, means for controlling the flow of water from the cells to the base of the pump wells, said pump wells being provided with pumps having outlet orifices adjacent the top of the said wells, and a distributing bay communicating with said orifices and adapted to receive pumped water and distribute same.

3. An installation for the collection and distribution of water comprising an enclosed concrete structure having an interior divided into a plurality of compartments by means of concrete partition walls, a first of said compartments being in the form of a first longitudinal chamber extending horizontally substantially throughout the width of said structure, a group of said compartments being in the form of a series of pump wells extending parallel to said first chamber, a pump within each of said wells, the partition walls between said first chamber and said wells having openings therethrough whereby said first chamber may be in communication with each of said wells, another of said compartments forming a second longitudinal chamber extending horizontally parallel to said first longitudinal chamber, said series of wells being between the two longitudinal chambers, the discharge ends of said pumps being in discharging communication with said second longitudinal chamber, another group of said compartments forming a second horizontal series of pump wells extending parallel to said second longitudinal chamber, the partition walls between said second chamber and said second series of wells having valve controlled openings therethrough whereby each of said second series of wells may be in communication with said second chamber, a pump within each of said second series of wells, and a plurality of conduits each leading from the discharge end of each of said pumps of said second series of wells.

4. The combination set forth in claim 3 wherein said first longitudinal chamber is divided by horizontal partition walls into a plurality of superimposed longitudinal horizontal cells, the partition walls between said cells and said first series of pump wells having communicating openings therethrough, a gate associated with each of said last recited openings, and individual means for each gate for actuating the latter independently of the other gates.

5. A water collecting and transmission installation comprising a first group of superimposed horizontal chambers, each chamber communicating with at least one water channel, a row of vertical cells adjacent said horizontal raw water chambers, valve means for controlling the flow of raw water from any of the horizontal chambers to any of the vertical cells, a row of pump wells adjacent to said row of cells and having means for controlling the flow of water to the base of said wells, said wells having pump outlet orifices proximate to the top of said wells, a second group of superimposed horizontal distribution chambers adapted to distribute pumped water, the topmost distribution chamber communicating with said pump outlet orifices and also with a settling basin adapted to remove sediment by gravitational force, means for controlling the flow of settled clear water from the settling basin to the horizontal distribution chamber below the topmost distribution chamber, and conduit means for removing sediment-containing water from said settling basin.

6. The apparatus of claim 5 wherein the means for controlling the flow of water consists of conduits having external gate valves over the conduit outlets, and internal gate valves intermediate the inlets and outlets of said conduits whereby closing of the same internal gate valves permits repairs on the outlet valves thereof without a closing down of the entire installation.

7. An installation for the collection and distribution of water comprising an enclosed concrete structure having an interior divided into a plurality of compartments by means of concrete partition walls, a first of said compartments being in the form of a first longitudinal chamber extending horizontally substantially throughout the width of said structure, a group of said compartments being in the form of a series of pump wells extending parallel to said first chamber, a pump within each of said wells, the partition walls between said first chamber and said wells having openings therethrough whereby said first chamber may be in communication with each of said wells, another of said compartments forming a second longitudinal chamber extending horizontally parallel to said first longitudinal chamber, said series of wells being between the two longitudinal chambers, the discharge ends of said pumps being in discharging communication with said second longitudinal chamber, a plurality of conduits each communicating with said second chamber and leading to the points of use to be supplied with water, a plurality of gates each being associated with a respective one of said partition wall openings for closing or opening said respective opening, and individual means for each gate for actuating and controlling the latter independently of the other gates.

ROSS NEBOLSINE.

References Cited in the file of this patent

UNITED STATES PATENTS

| Number | Name | Date |
|---|---|---|
| 426,988 | Crocker | Apr. 29, 1890 |
| 814,180 | Wixford | Mar. 6, 1906 |
| 814,634 | Wixford | Mar. 6, 1906 |
| 2,129,181 | Morse | Sept. 6, 1938 |